United States Patent [19]

Rao et al.

[11] Patent Number: 4,980,397

[45] Date of Patent: Dec. 25, 1990

[54] CATIONIC, ADVANCED EPOXY RESIN COMPOSITIONS BASED ON ALIPHATIC DIOLS, DIHYDRIC PHENOLS AND DIGLYCIDYL ETHERS OF DIHYDRIC PHINOLS

[75] Inventors: Nancy A. Rao; Richard A. Hickner, both of Lake Jackson, Tex.

[73] Assignee: The Dow Chemical Company, Midland, Mich.

[21] Appl. No.: 376,799

[22] Filed: Jul. 6, 1989

Related U.S. Application Data

[62] Division of Ser. No. 69,459, Jul. 2, 1987, Pat. No. 4,868,230.

[51] Int. Cl.$^5$ .................... C08L 63/02; C08G 59/14
[52] U.S. Cl. ................................ 523/414; 523/415; 523/416; 523/417; 523/424; 525/523; 525/528; 525/533; 528/103; 528/104; 204/181.7
[58] Field of Search .............. 204/181.7; 523/414, 523/415, 416, 417, 424; 525/523, 528, 533; 528/103, 104

[56] References Cited

U.S. PATENT DOCUMENTS 4,698,141  10/1987  Anderson et al. ............... 523/415
4,868,230   9/1989  Rao et al. ........................ 528/103

*Primary Examiner*—John Kight, III
*Assistant Examiner*—Federick Krass

[57] ABSTRACT

A method for preparing an advanced epoxy cationic resin from an opoxy-based resin containing oxirane groups by converting at least some of the oxirane groups to cationic groups, wherein the improvement is using as the epoxy-based resin an advanced epoxy resin obtained by reacting in the presence of a suitable catalyst (1) a diglycidylether of an aliphatic diol which is essentially free of ether oxygen atoms, such as a diglycidyl ether of 1,4-butanediol, (2) a diglycidylether of a dihydric phenol, for example a diglycidyl ether of bisphenol A and (3) a dihydric phenol such as bisphenol A and optionally a capping agent such as p-nonylphenol.

Coating compositions suitable for electro-deposition are prepared from the product obtained by the process.

18 Claims, No Drawings

CATIONIC, ADVANCED EPOXY RESIN COMPOSITIONS BASED ON ALIPHATIC DIOLS, DIHYDRIC PHENOLS AND DIGLYCIDYL ETHERS OF DIHYDRIC PHINOLS

CROSS-REFERENCE TO RELATED APPLICATION

This application is a divisional application of application Ser. No. 07/069,459 filed July 2, 1987 now U.S. Pat. No. 4,868,230 which is incorporated herein by reference in its entirety.

BACKGROUND OF THE INVENTION

1. Field of the Invention

The invention is concerned with cationic, advanced epoxy resin compositions, a method for their preparation and the use of such compositions in cathodic electrodeposition.

2. Description of the Prior Art

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Since these reactions require long cook times, they are subject to gellation because of competitive polymerization of the epoxy groups by the base catalyst. In addition epoxy resins containing low levels of chlorine are required to prevent deactivation of this catalyst.

Many coating formulations applied by electrodeposition include pigments to provide color, or opacity or application or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers of polyphenols, polyglycidyl ethers of polyhydric alcohols and polyepoxides having oxyalkylene groups in the epoxy molecule.

The automobile industry still has needs in the areas of controlled film thickness and lower temperature cure systems. The ability to build thicker, uniform films which are smooth and free of defects will allow the elimination of an intermediate layer of paint known as a primer surfacer or spray primer, previously required to yield a sufficiently smooth surface for the topcoat. Such an elimination results in removal of one paint cycle and provides more efficient operations. Thicker electrocoat primers may also provide improved corrosion resistance.

SUMMARY OF THE INVENTION

The present invention is directed to an advanced epoxy cationic resin having a charge density of from about 0.2 to about 0.6 milliequivalent of cationic charge per gram of resin prepared by reacting in the presence of a suitable catalyst (A) a composition comprising (1) at least one diglycidyl ether of an aliphatic diol which diol is essentially free of ether oxygen atoms and (2) at least one diglycidyl ether of a dihydric phenol with (B) at least one dihydric phenol and optionally, (C) a monofunctional capping agent; wherein components (A-1) and (A-2) are employed in quantities such that from about 10 to about 75 weight percent of the diglycidyl ethers contained in component (A) are contributed by Component (A-1) and from 25 to about 90, weight percent of such glycidyl ethers are contributed by component (A-2) and components (A) and (B) are employed in such quantities that the resultant advanced epoxy resin has an average epoxide equivalent weight of from about 350 to about 10,000, whereby there is formed an advanced epoxy resin having terminal oxirane groups; and subsequently converting the oxirane groups to cationic groups by reacting the resin with a nucleophile and adding an organic acid and water at at least one point in the process.

The present invention is also directed to a coating composition comprising an aqueous dispersion of the above-described cationic, advanced epoxy resin, a method for making such compositions and a method for coating such compositions.

DETAILED DESCRIPTION OF THE INVENTION

The cationic, advanced epoxy resin compositions of the invention contain the resins obtained from a selected advanced epoxy resin having terminal oxirane groups by reacting at least some of the epoxy (oxirane) groups of the resin with a nucleophile and adding an organic acid and water at some point during the preparation.

The Advanced Epoxy Resin

The starting epoxy resin component for preparing the cationic, advanced epoxy resin compositions is an advanced resin prepared by reacting a composition comprising a glycidyl ether of an aliphatic diol which diol is essentially free of ether oxygen atoms (A-1), a glycidyl ether of a dihydric phenol (A-2) with a dihydric phenol (B) and optionally, a monohydric capping agent (C). Glycidyl ethers of dihydric phenols useful for the preparation of these resins are those having at least one, and preferably an average of about two, vicinal epoxide groups per molecule. These polyepoxides can be produced by condensation of an epihalohydrin with a polyphenol in the presence of a basic acting substance.

Useful glycidyl ethers of polyphenols are represented by Formulae I and II:

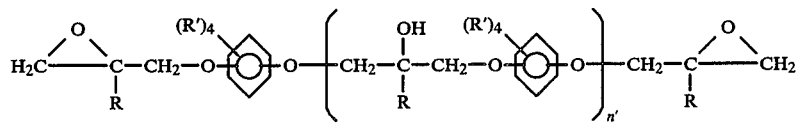

FORMULA II

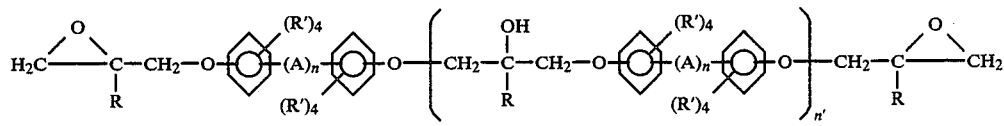

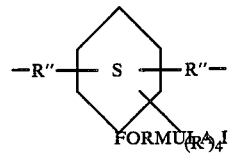

wherein A is a divalent hydrocarbon group having from 1 to 12, preferably 1 to 6 carbon atoms, —S—, —S—S—, —SO—, —SO$_2$—, —CO—, —O—CO—O—, —O— or the like: each R is independently hydrogen or a hydrocarbyl group having from 1 to 3 carbon atoms: each R' is independently hydrogen, a hydrocarbyl or hydrocarbyloxy group having from 1 to 4 carbon atoms, or a halogen, preferably chlorine or bromine; n has a value from zero to 1; and n' has a value from zero to about 10, preferably from 0.1 to 5.

Polyphenols useful for the production of these polyepoxides include 2,2-bis(4-hydroxyphenyl)propane (bisphenol A), 1,1-bis(4-hydroxyphenyl)ethane, bis(4-hydroxyphenyl)methane (bisphenol F), p,p'-hydroxybiphenol, resorcinol, hydroquinone, or the like. The particularly preferred polyglycidyl ethers of polyphenols are the diglycidyl ether of bisphenol A and the oligomeric polyglycidyl ethers of bisphenol A.

The glycidyl ethers of aliphatic diols essentially free of ether oxygen atoms useful in preparation of these epoxy resins are those having the structure:

FORMULA III

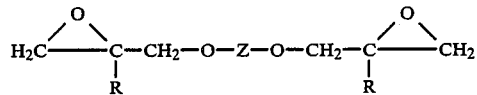

wherein each R is independently hydrogen or a hydrocarbyl group having from 1 to 3 carbon atoms; Z is a divalent aliphatic or cycloaliphatic group essentially free of ether oxygen atoms and having from to about 20, preferably from 2 to about 12, carbon atoms or one of the groups represented by the formulas

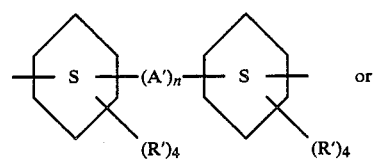 or

A' is a divalent hydrocarbon group having from 1 to about 6 carbon atoms; each R' is independently hydrogen, a hydrocarbyl or hydrocarbyloxy group having from 1 to 4 carbon atoms; each R" is an aliphatic group having from 1 to about 6, preferably from 1 to about 4, carbon atoms; and n has a value of zero or 1. Examples of useful aliphatic diols which are essentially free of ether oxygen atoms are 1,4-butanediol, 1,6-hexanediol, 12-dodecanediol, neopentylglycol, dibromoneopentyl glycol, 1,3-cyclohexanediol, hydrogenated bisphenol A, 1,4-cyclohexanedimethanol, 1,2-cyclohexanediol, 1,4-cyclohexanediol, combinations thereof and the like.

The glycidyl ethers of aliphatic diols which are essentially free of ether oxygen atoms can be produced by the condensation of an epihalohydrin with an aliphatic diol which is essentially free of ether oxygen atoms having the structure:

HO—Z—OH where Z is as defined above. The resultant halohydrin ether product is then dehydrohalogenated by known methods with a basic acting material such as sodium hydroxide.

Some of the common methods of synthesis of the diglycidylethers of aliphatic diols which are essentially free of ether oxygen atoms produce significant amounts of organic chloride-containing impurities. However, other processes are known for preparing products with lower levels of such impurities. While the low-chloride resins are not required for the practice of this invention, they may be used, if desired, for possible improvements in the process of preparing the resins, in the storage properties of the resins or formulated coatings made therefrom or in the performance properties of the products.

Mixtures containing the above two glycidyl ether components are reacted with a diphenol and, optionally, a capping agent to produce epoxy-functional resins having the desired epoxide (oxirane) group content which are used to prepare the resins of the invention. The effective proportions of the diglycidyl ether components range from about 10 to about 75 weight percent of the diglycidylether of an aliphatic diol essentially free of ether oxygen atoms (A-1) and from about 25 to about 90 weight percent of the diglycidyl ether of a diphenol (A-2). However, better overall results are obtained with from about 10 to about 50 weight percent of the diglycidylether of an aliphatic diol essentially free of ether oxygen atoms and from about 50 to about 90 weight percent of the diglycidylether of a phenol. Especially preferred is from about 15 to about 35 weight percent of the diglycidylether of an aliphatic diol essentially free of ether oxygen atoms and correspondingly from about 65 to about 85 weight percent of the diglycidyl ether of a diphenol. While products containing higher than 90 percent of the diglycidylether of an aliphatic diol essentially free of ether oxygen atoms will electrodeposit to give high film build, their rupture voltage limits their use to the lower voltages which do not provide sufficient throwing power for many applications such as in electrocoating automobile bodies. The proportions of the glycidyl ether components (A=A−1+A−2) and the dihydric phenol (B) are selected to provide an average epoxy equivalent weight in the advanced epoxy resin of from about 350 to about 10,000, preferably from about 600 to about 3,000. Such proportions usually are in the range of from about 60 to about 90 weight percent of A and from about 10 to about 40 weight percent of B. Useful diphenolic compounds include those described above as suitable for production of polyepoxide. The preferred diphenol is bisphenol A. Also useful are the bisphenols produced by chain extension of the diglycidyl ether of a bisphenol with a molar excess of a bisphenol to produce a diphenolic functional oligomeric product.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of zero to 0.7 equivalent of phenolic hydroxyl groups per equivalent of epoxy which would remain after reaction of substantially all of the phenolic groups of the diphenol.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The total number of phenolic groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the A and B components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture may be done prior to, substantially simultaneously with, or subsequent to the chain-extension reactions of the diphenolic compound and the polyglycidylether components. The preferred method is to have all of the reactants present simultaneously.

Reactions of the above components to produce the epoxy resins are typically conducted by mixing the components and heating, usually in the presence of a suitable catalyst, to temperatures between 130° and 200° C., preferably between 150° and 175° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex, ethyltriphenylphosphonium chloride, ethyltriphenylphosphonium bromide, ethyltriphenylphosphonium iodide, or ethyltriphenylphosphonium phosphate, and tetrabutylphosphonium acetate.acetic acid complex. The catalysts are typically used at levels of 0.01 to 0.5 mole percent of the epoxide groups.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether and propylene glycol monophenylether. Solvent content may range from zero to about 30 percent of the reaction mixture. A solvent is usually chosen which is compatible with the subsequent cation-forming reactions and with the final coating composition so that the solvent does not require subsequent removal.

Unexpectedly, incorporation of these glycidyl ethers of aliphatic diols essentially free of ether oxygen atoms into the epoxy resin confer to cathodically electrodepositable coating compositions produced therefrom the ability to build thicker films having controlled thickness during the electrodeposition process, as compared to a similar composition using an epoxy resin not containing the aliphatic diol essentially free of ether oxygen atoms/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of aliphatic diol essentially free of ether oxygen atoms incorporated into the epoxy resin. Generally, thickness increases with increasing content of this component.

Another advantage is that the cationic epoxy resins containing the diglycidylether of an aliphatic diol essentially free of ether oxygen atoms have a lower viscosity at a given temperature than unmodified cationic resins of the same molecular weight. This lower viscosity allows the use of higher molecular weight resins and/or less solvent to achieve a viscosity comparable to an unmodified resin. The lower viscosity resins allow the coating composition greater flowout during deposition and curing which results in better appearance. Alternatively, the lower viscosity resins enable curing at lower temperatures to give equivalent flow and appearance. Finally, coatings produced using these epoxy resins have greater flexibility due to incorporation of the diglycidylether of an aliphatic diol essentially free of ether oxygen atoms component as compared to those based on similar resins not containing that component.

The Nucleophile

The nucleophilic compounds which can be used advantageously in forming the cations required by this invention are represented by the following classes of compounds, sometimes called Lewis bases:

(a) monobasic heteroaromatic nitrogen compounds;
(b) tetra (lower alkyl)thioureas;
(c) $R^1$—S—$R^2$ wherein $R^1$ and $R^2$ individually are lower alkyl, hydroxy lower alkyl or wherein $R^1$ and $R^2$ are combined as one alkylene radical having 3 to 5 carbon atoms;

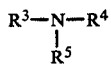 (d)

wherein $R^3$ and $R^4$ individually are lower alkyl, hydroxy lower alkyl,

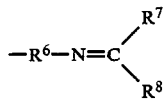

or are combined as one alkylene radical having from 3 to 5 carbon atoms, $R^6$ is an alkylene group having from 2 to 10 carbon atoms, $R^7$ and $R^8$ individually are lower alkyl and $R^5$ is hydrogen or lower alkyl, aralkyl or aryl, except that when $R^3$ and $R^4$ together are an alkylene group then $R^5$ is hydrogen, lower alkyl or hydroxyalkyl and when either or both of $R^3$ and $R^4$ is

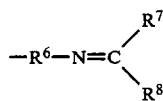

then $R^5$ is hydrogen; and

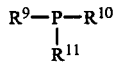 (e)

wherein $R^9$, $R^{10}$ and $R^{11}$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl.

Representative specific nucleophilic compounds are pyridine, nicotinamide, quinoline, isoquinoline, tetramethyl thiourea, tetraethyl thiourea, hydroxyethyl methyl sulfide, hydroxyethyl ethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethylamine, diethylamine, dibutylamine, N-methylethanolamine, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone: N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, triisobutylamine, hydroxyethyl-dimethylamine, butyldimethylamine, trihydroxyethylamine, triphenylphosphine, and N,N,N-dimethylphenethylamine.

The Acid

Substantially any organic acid, especially a carboxylic acid, can be used in the conversion reaction to form onium salts so long as the acid is sufficiently strong to promote the reaction between the nucleophile and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H^\oplus A^\ominus$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1–4 carbon atoms. Acetate and lactate are the most preferred anions.

The Conversion Process to Form Cationic Resins

The conversion reaction is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from about 25° C. to about 100° C., with preferred reaction rates being observed at temperatures from about 60° to about 80° C.

Good results can be achieved by using substantially stoichiometric amounts of reactants although a slight excess or deficiency of the epoxy containing resin or the nucleophile can be used. With weak acids, useful ratios of the reactants range from 0.5 to 1.0 equivalent of nucleophile per epoxide group of the resin and 0.6 to 1.1 equivalents of acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophile and the epoxy group of the resin. When the nucleophile is a secondary amine, the amine-epoxy reaction can be conducted first, followed by addition of the acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from about 5 to about 30 moles per epoxy equivalent. When the nucleophile is a secondary amine, the water can be added before, during, or after the resin epoxy group/nucleophile reaction. The preferred range of charge density of the cationic, advanced epoxy resin is from about 0.2 to about 0.6 milliequivalent of charge per gram of the resin.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$–$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophile can be removed by standard methods, e.g., dialysis, vacuum stripping and steam distillation.

Other Embodiments of the Invention

The cationic, advanced epoxy resins of this invention in the form of aqueous dispersions are useful as coating compositions, especially when applied by electrodeposition. The coating compositions containing the cationic resins of this invention as the sole resinous component are useful but it is preferred to include crosslinking agents in the coating composition so that the coated films, when cured at elevated temperatures, will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include, for example, blocked polyisocyanates; amine-aldehyde resins such as melamine-formaldehyde, urea-formaldehyde, benzoguanine-formaldehyde, and their alkylated analogs; and phenolaldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1–24, incorporated by reference herein. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25–57, incorporated herein by reference. In the preparation of the prepolymers, reactant functionality, equivalent ratios, and methods of contacting the reactants must be chosen in accordance with considerations known in the art to provide ungelled products having the desired functionality and equivalent weight.

Preferred polyisocyanates are the isocyanurate trimer of hexamethylene diisocyanate, toluene diisocyanate, methylene diphenylene diisocyanate, isophorone diisocyanate and a prepolymer of toluene diisocyanate and trimethylolpropane.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known as ketoximes, due to their tendency to deblock at relatively lower temperatures and provide a coating composition which can be cured at significantly lower temperatures. The particularly preferred ketoxime is methyl ethyl ketoxime.

These cationic resins of the invention, when formulated with certain preferred ketoxime-blocked polyisocyanates, provide coating compositions which cure at significantly lower temperatures than those of the prior art.

The blocked polyisocyanates are prepared by reacting equivalent amounts of the isocyanate and the blocking agent in an inert atmosphere such as nitrogen at temperatures between 25° C. to 100° C., preferably below 70° C. to control the exothermic reaction. Sufficient blocking agent is used so that the product contains no residual, free isocyanate groups. A solvent compatible with the reactants, product, and the coating composition may be used such as a ketone or an ester. A catalyst may also be employed such as dibutyl tin dilaurate.

The blocked polyisocyanate crosslinking agents are incorporated into the coating composition at levels corresponding to from about 0.2 to about 2.0 blocked isocyanate groups per hydroxyl group of the cationic resin. The preferred level is from about 0.5 to about 1.0 blocked isocyanate group per resin hydroxyl group.

A catalyst optionally may be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. Amounts used typically range between 0.1 and 3 weight percent of binder solids.

Unpigmented coating compositions are prepared by blending the cationic resinous product with the crosslinking agent and optionally any additives such as catalysts, solvents, surfactants, flow modifiers, defoamers, or other additives. This mixture is then dispersed in water by any of the known methods. A particularly preferred method is the technique known as phase-inversion emulsification, wherein water is slowly added with agitation to the above mixture, usually at temperatures ranging from ambient to 70° C., until the phases invert to form an organic phase-in-water dispersion.

The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of glycol ether solvent. The cationic resinous product is prepared by reacting an epichlorohydrin/bisphenol A condensation product having an epoxide group content of about 8 percent with a nucleophile, an acid, and water in a similar fashion as described above for the cationic resins used in the preferred embodiment of the invention. The water-soluble product may be diluted with water to form a clear solution useful as a pigment grinding vehicle.

The pH and/or conductivity of the coating compositions may be adjusted to desired levels by the addition of compatible acids, bases, and/or electrolytes known in the art. Other additives such as solvents, surfactants, defoamers, anti-oxidants, bactericides, etc. may also be added to modify or optimize properties of the compositions or the coating in accordance with practices known to those skilled in the art.

Although the coating compositions of the invention may be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. In the case of the coating compositions of the invention, thicker films are achieved by incorporation of the diglycidyl ether of an aliphatic diol essentially free of ether oxygen atoms into the epoxy resin used to produce the cationic resins of the invention. Also, control over the final thickness may be exercised by adjusting the amount of that component used. Current is allowed to flow for between a few seconds to several minutes, typically two minutes over which time the current usually decreases. Any electrically conductive substrate may be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from about 200° F. to about 400° F., for periods of about 1 to about 60 minutes. For the embodiments of the invention using the ketoxime-blocked polyisocyanate curing agents, satisfactory cure of the resulting coating can be achieved at cure schedules as low as 250° F. for 30 minutes, as compared to 325° F. to 350° F. for 20 to 30 minutes for systems typically used in the art.

All of the coating compositions of the invention provide useful cathodically electrodepositable coatings having improved flowout, film build, and flexibility properties due to the incorporation of the diglycidyl ether of an aliphatic diol essentially free of ether oxygen atoms component.

EXAMPLES

In the following examples, epoxy resins were used as starting materials which are characterized as follows:

Epoxy Resin A is the diglycidyl ether of 1,4-butanediol having an epoxide equivalent weight (EEW) of 125 available from Wilmington Chemical Corp. as Heloxy TM WC-67.

Epoxy Resin B is the diglycidyl ether of cyclohexanedimethanol having an EEW of 163 available from Wilmington Chemical Corp. as Heloxy TM MK-107.

Epoxy Resin C is the diglycidyl ether of neopentyl glycol having an EEW of 135 available from Wilmington Chemical Corporation as Heloxy TM WC-68.

Epoxy Resin D is a diglycidyl ether of bisphenol A having an EEW of 187.

Curing Agent A is a blocked polyisocyanate available from Mobay Chemical Company as Desmodur KL5-2540. The material is believed to be the reaction product of methyl ethyl ketoxime and a polyisocyanate which is substantially the isocyanurate trimer of hexamethylene diisocyanate. The product is supplied as a 75 percent solution of the blocked polyisocyanate in propylene glycol monomethylether acetate.

Curing Agent B is prepared by charging to a one-liter, round-bottom flask fitted with a nitrogen inlet, thermometer, condenser, mechanical stirrer, and an additional funnel with 626.3 parts by weight (pbw) of Spencer Kellog's Spenkel TM P49-A6-60, a 60 percent solution of an isocyanate terminated prepolymer from toluene diisocyanate and trimethylolpropane dissolved in methoxypropyl acetate. The solution is stirred at ambient temperature (22° C. to 24° C.) and 0.62 pbw of dibutyl tin dilaurate catalyst is added. Two hundred pbw of 2-ethylhexanol is added dropwise over a period of two hours. The temperature of the reaction mixture is allowed to rise, during the addition, to 50° C. to 60° C. The reaction mixture is then cooled to ambient temperature over two hours. The infrared spectrum of the product shows no residual unreacted isocyanate groups The product solution is approximately 68.9 percent nonvolatile.

Pigment Grinding Vehicle A is prepared by charging into a two-liter, round-bottom flask fitted with a nitrogen inlet, thermometer, mechanical stirrer and condenser 340.3 parts by weight (pbw) of Epoxy Resin D and 109.7 pbw of bisphenol A. The mixture is stirred under a nitrogen atmosphere and heated to 90° C. to form a clear mixture. A solution containing 70 percent by weight of ethyl triphenyl phosphonium acetate° acetic acid complex in methanol (0.6 pbw) is added. The mixture is then heated to 150° C. at a rate of 1° C. to 2° C. per minute and then allowed to exotherm to 170° C. The temperature is raised to 175° C. and maintained for 30 minutes, at which time the epoxide content of the resin is 8.1 percent by weight. The resin is cooled to 130° C., diluted with 50.0 pbw of ethylene glycol monobutyl ether, and cooled to 75° C. to give an epoxy resin solution. A mixture of 77.5 pbw of nicotinamide, 72.4 pbw of lactic acid, and 212.5 pbw of water is added to the resin solution over 65 minutes at 73° to 79° C. The mixture is then reacted 3 hours at 76° to 79° C. The resulting clear, light yellow, cationic resin solution is diluted to approximately 40 percent non-volatiles with 673.1 pbw of water to produce a clear, yellow solution useful as a pigment grinding vehicle.

Pigment Grinding Vehicle B is prepared by charging into a two-liter, round-bottom flask fitted with a nitrogen inlet, thermometer, mechanical stirrer and condenser 340.3 parts by weight (pbw) of Epoxy Resin D and 109.7 pbw of bisphenol A. The mixture is stirred under a nitrogen atmosphere and heated to 90° C. to form a clear mixture. A solution containing 70 percent by weight of ethyl triphenyl phosphonium acetate acetic acid complex in methanol (0.6 pbw) is added. The mixture is then heated to 150° C. at a rate of 1° C. to 2° C. per minute and then allowed to exotherm to 170° C. The temperature is raised to 175° C. and maintained for 30 minutes, at which time the epoxide content of the resin is 8.1 percent by weight. The resin is cooled to 130° C., diluted with 50.0 pbw of ethylene glycol monobutyl ether, and cooled to room temperature to give an epoxy resin solution. A portion, 422 pbw, of this advanced epoxy resin solution is heated to 65° C. and 47.1 pbw of N-methyl-2aminoethanol is added dropwise over 22 minutes with cooling to maintain a temperature at 65° C. to 74° C. The temperature is then maintained at 80° C. for three hours. A solution, 75.4 pbw, which contains 75 percent of lactic acid is diluted with water and then the resulting solution is added at 75° C. to 80° C. to the reaction mixture. Thereafter, dilution of the product with additional water, 458.7 pbw, provides a cationic epoxy resin solution containing 40 percent non-volatiles.

Pigment Paste A is prepared by placing a pigment blend, 100 pbw, comprising 35 pbw of clay, 35 pbw of titanium dioxide, 20 pbw of lead silicate and 10 pbw of carbon black in a metal paint can along with 50 pbw of Pigment Grinding Vehicle A. Enough chrome-plated steel pellets, about 2 mm in diameter by 5 mm long, are added to comprise about one-third of the final bulk volume. The pigments are ground and dispersed in the vehicle by placing the can on a paint shaker for 45 minutes. Water is then added and blended in to reduce the viscosity slightly and the grinding pellets removed by filtration. The final pigment dispersion contains 55 percent pigment by weight.

Pigment Paste B is prepared in the same manner as Pigment Paste A except that Pigment Grinding Vehicle B is employed instead of Pigment Grinding Vehicle A.

COATING AND TESTING THE COMPOSITIONS

The coating compositions are placed in a stainless steel tank, agitated, and maintained at 80° F. Unpolished steel test panels having Bonderite TM 40 treatment and P60 rinse available from Advanced Coating Technologies, Inc. are immersed in the tank and connected as the cathode to a D.C. voltage source, with the tank walls serving as the anode. The desired voltage is applied for two minutes, then the panels are removed, rinsed with deionized water, and baked at the specified temperature for 30 minutes.

EXAMPLE 1

A cationic electrodeposition resin is prepared by charging into a suitable reactor 27 grams of Epoxy Resin A, 81 grams of Epoxy Resin D, 20 grams of nonyl phenol, and 72 grams of bisphenol A. The mixture is heated to 80° C. and 0.15 gram of a 70 percent by weight solution of ethyltriphenyl phosphonium acetate acetic acid complex in methanol is added. This blend is stirred while heating at 1.5° C./min. to 150° C. whereupon it exotherms to 165° C. where the temperature is held for about one hour. The EEW of the resulting resin is 2028 grams/equivalent.

After cooling this resin to 120° C., 22 grams of propylene glycol phenyl ether solvent is added. The resin solution is cooled to 60° C. and 7.5 grams of N-methylethanolamine is added whereupon it exotherms to 67° C. and the temperature is controlled at 60° C. for one hour.

To the reaction product at 60° C., are added 2.06 grams of dibutyl tin dilaurate catalyst and 137.6 grams of Curing Agent A.

While agitating continuously, a cationic dispersion is prepared by adding to the resulting mixture, at 60° C., 9.82 grams of an aqueous solution containing 75 percent by weight of lactic acid which is followed by the slow addition of 1401 grams of deionized water. This product is referred to as Resin Dispersion 1.

Resin Dispersion 1 is blended with 148 grams of Pigment Paste B to yield a cathodic electrodeposition paint having a pigment to binder ratio of 0.2 to 1. Steel panels pretreated with zinc phosphate are cathodically electrodeposited at various voltages for 2 minutes at a bath temperature of 82° F. (27° C.). The wet films are baked at 275° F. (135° C.) for 30 minutes. Film thicknesses are given in Table I.

EXAMPLE 2

A cationic electrodeposition resin is prepared by charging into a suitable reactor 27.5 grams of Epoxy Resin B, 82.5 grams of Epoxy Resin D, 20 grams of nonyl phenol, and 70 grams of bisphenol A. The mixture is heated to 80° C. and 0.11 gram of ethyltriphenyl phosphonium acetate.acetic acid complex catalyst blended with 0.04 gram of methanol is added. This blend is stirred while heating at 1.5° C./min. to 150° C. whereupon it exotherms to 165° C. where the temperature is held for about one hour. The EEW of the resulting resin is 1641 grams/equivalent.

After cooling this resin to 120° C., 22 grams of propylene glycol phenyl ether solvent is added. The resin solution is cooled to 60° C. and 9 grams of N-methylethanolamine is added whereupon it exotherms to 67° C. and the temperature is controlled at 60° C. for one hour.

To the reaction product at 60° C., are added 2.09 grams of dibutyl tin dilaurate catalyst and 139 grams of Curing Agent A.

While agitating continuously, a cationic dispersion is prepared by adding to the resulting mixture, at 60° C., 12.3 grams of an aqueous solution containing 75 percent by weight of lactic acid which is followed by the slow addition of 1427 grams of deionized water. This product is referred to as Resin Dispersion 2.

Resin Dispersion 2 is blended with 112 grams of Pigment Paste B to yield a cathodic electrodeposition paint having a pigment to binder ratio of 0.2 to 1. Steel panels pretreated with zinc phosphate are cathodically electrodeposited at various voltages for 2 minutes at a bath temperature of 82° F. (27° C.). The wet films are baked at 275° F. (135° C.) for 30 minutes. Film thicknesses are given in Table 1.

EXAMPLE 3

A cationic electrodeposition resin is prepared by charging into a suitable reactor 27 grams of Epoxy Resin C, 81 grams of Epoxy Resin D, 20 grams of nonyl phenol, and 72 grams of bisphenol A. The mixture is heated to 80° C. and 0.11 gram of ethyltriphenyl phosphonium acetate acetic acid complex catalyst blended with 0.04 gram of methanol is added. This blend is stirred while heating at 1.5° C./min. to 150° C. whereupon it exotherms to 165° C. where the temperature is held for about one hour. The EEW of the resulting resin is 2337 grams/equivalent.

After cooling this resin to 120° C., 22 grams of propylene glycol phenyl ether solvent is added. The resin solution is cooled to 60° C. and 6.42 grams of N-methylethanolamine is added whereupon it exotherms to 67° C. and the temperature is controlled at 60° C. for one hour.

To the reaction product at 60° C., are added 2.06 grams of dibutyl tin dilaurate catalyst and 138 grams of Curing Agent A.

While agitating continuously, a cationic dispersion is prepared by adding to the resulting mixture, at 60° C., 8.75 grams of an aqueous solution containing 75 percent by weight of lactic acid which is followed by the slow addition of 1397 grams of deionized water. This product is referred to as Resin Dispersion 3.

Resin Dispersion 3 is blended with 111 grams of Pigment Paste B to yield a cathodic electrodeposition paint having a pigment to binder ratio of 0.2 to 1. Steel panels pretreated with zinc phosphate are cathodically electrodeposited at various voltages for 2 minutes at a bath temperature of 82° F. (27° C.). The wet films are baked at 275° F. (135° C.) for 30 minutes. Film thicknesses are given in Table 1.

EXAMPLE 4

A cationic electrodeposition resin is prepared by charging into a suitable reactor 247.5 grams of Epoxy Resin C, 371.2 grams of Epoxy Resin D, and 381.3 grams of bisphenol A. The mixture is heated to 80° C. and 1.9 grams of a 70% solution of ethyltriphenylphosphonium acetate.acetic acid complex is added. This blend is stirred while heating at 1.5° C./minute to 150° C. whereupon it exotherms to 165° C. where the temperature is held for about one hour. The epoxy equivalent weight of the resulting resin is 1861.

To 175 grams of this advanced epoxy resin is added 19.4 grams of propylene glycol phenyl ether solvent at 120° C. This resin solution is cooled to 70° C. and a solution of 8.37 grams of dimethylethanolamine, 8.05 grams of an aqueous solution of 72.5% lactic acid, and 42.3 grams of water is added dropwise. The reaction mixture exotherms to 80° C. and the temperature is controlled at 80° C. for six hours.

To the reaction product at 80° C. is added 2.64 grams of dibutyl tin dilaurate catalyst and 189 grams of Curing Agent B.

While agitating continuously, a cationic dispersion is prepared by adding dropwise to the resulting mixture, at 70° C., 1702 grams of deionized water. This is Resin Dispersion 4.

Resin Dispersion 4 is blended with sufficient Pigment Paste B to yield a cathodic electrodeposition paint having a pigment to binder ratio of 0.2 to 1. Steel panels pretreated with zinc phosphate are cathodically electrocoated at various voltages for two minutes at a bath temperature of 80° F. (27° C.). The wet films are baked at 350° F. (177° C.) for 30 minutes. The resultant film thicknesses are shown in Table I.

COMPARATIVE EXPERIMENT A

A cationic electrodeposition resin is prepared by charging into a suitable reactor 596.2 grams of Epoxy Resin D and 303.8 grams of bisphenol A. The mixture is heated to 80° C. and 1.57 grams of a 70% solution of ethyltriphenylphosphonium acetate acetic acid complex is added. This blend is stirred while heating at 1.5° C./minute to 150° C. whereupon it exotherms and the peak exotherm is controlled below 190° C. by cooling. The temperature is then allowed to fall to 175° C. and then maintained at 175° C. until 70 minutes past the peak exotherm. The epoxy equivalent weight of the resulting resin is 1810.

To 313.1 grams of this advanced epoxy resin is added 78.3 grams of ethylene glycol monobutyl ether solvent at 120° C. This resin solution is heated under nitrogen to between 110° C. to 130° C. and stirred to form a solution. The solution is then cooled to 80° C. and a mixture of 15.9 grams of nicotinamide, 14.8 grams of an aqueous solution of 72.5% lactic acid, and 33.3 grams of water is added over a period of 30 minutes to produce an opaque, whitish, viscous mixture. The reaction temperature of 80° C. is maintained for 5.25 hours.

Thirty minutes after completion of the above addition, 44.6 grams of additional water is added over a period of 30 minutes. The reaction mixture is maintained at 80° C. for three hours after completion of the first addition. The product is a clear, light yellow, highly viscous solution.

To 194.5 grams of the above product at 70° C. is added 3.3 grams of dibutyl tin dilaurate and 118.2 grams of Curing Agent A. The mixture is cooled to 60° C. and 1185.0 grams of deionized water is added dropwise. The temperature of the mixture is steadily decreased as the addition proceeds such that the temperature is 40° C. to 50° C. when the mixture inverts. This is Resin Dispersion 5.

Resin Dispersion 5 is blended with sufficient Pigment Paste A to yield a cathodic electrodeposition paint having a pigment to binder ratio of 0.2 to 1. Steel panels pretreated with zinc phosphate are cathodically electrocoated at various voltages for two minutes at a bath temperature of 80° F. (27° C.). The wet films are baked at 275° F. (135° C.) for 30 minutes. The resultant film thicknesses are shown in Table I.

In electrodeposition coatings, higher voltages typically result in higher film thicknesses. The data in Table I shows that even at higher voltages, the coatings of the prior art do not achieve the coating thickness obtained by the present invention at lower voltages.

TABLE I

| RESIN DISPERSION | FILM THICKNESS IN MILS/MM AT INDICATED VOLTAGE | | FILM THICKNESS IN MILS/MM AT INDICATED VOLTAGE | | FILM THICKNESS IN MILS/MM AT INDICATED VOLTAGE | | FILM THICKNESS IN MILS/MM AT INDICATED VOLTAGE | | FILM THICKNESS IN MILS/MM AT INDICATED VOLTAGE |
|---|---|---|---|---|---|---|---|---|---|
| | 50 V | 75 V | 100 V | 125 V | 175 V | 200 V | 225 V | 250 V | 300 V |
| 1 | — | 0.73/ 0.019 | 0.91/ 0.023 | 1.0/ 0.025 | — | — | — | — | — |
| 2 | — | 0.47/ 0.012 | 0.68/ 0.017 | 0.83/ 0.021 | — | — | — | — | — |
| 3 | 0.55/ 0.014 | 0.72/ 0.018 | 0.82/ 0.021 | — | — | — | — | — | — |
| 4 | — | — | — | — | 0.62/ 0.016 | 0.79/ 0.020 | 1.0/ 0.025 | 1.2/ 0.030 | — |
| 5* | — | — | — | — | — | 0.35/ 0.009 | — | 0.35/ 0.009 | 0.4/ 0.010 |

*Not an Example of the Present Invention

What is claimed is:

1. In a process for the preparation of an advanced epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion, the improvement of using as the epoxy resin composition an advanced epoxy resin obtained by reacting in the presence of a suitable catalyst
   (A) a composition comprising
      (1) at least one diglycidylether of an aliphatic diol which diol is essentially free of ether oxygen atoms: and
      (2) a diglycidylether of a dihydric phenol: with
   (B) at least one dihydric phenol
wherein (A-1) and (A-2) are employed in such quantities that about 10 to about 75 weight percent of the glycidyl ethers contained in component (A) are contributed by (A-1) and from about 25 weight percent about 90 weight percent of the glycidyl ethers are contributed by (A-2) and wherein components (A) and (B) are employed in such quantities that the resultant epoxide equivalent weight is from about 350 to about 10,000; whereby there is obtained a cationic, advanced epoxy resin having a charge density of from about 0.2 to about 0.6 milliequivalent of charge per gram of resin.

2. In process for the preparation of an advanced epoxy cationic resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion, the improvement of using as the epoxy resin composition an advanced epoxy resin obtained by reacting in the presence of a suitable catalyst
   (A) a composition comprising
      (1) at least one diglycidyl ether of an aliphatic diol which diol is essentially free of ether oxygen atoms; and
      (2) a diglycidyl ether of a dihydric phenol;
   (B) at least one dihydric phenol; and
   (C) a monofunctional capping agent;
wherein (A-1) and (A-2) are employed in such quantities that about 10 to about 75 weight percent of the glycidyl ethers contained in component (A) are contributed by (A-1) and from about 25 weight percent to about 90 weight percent of the glycidyl ethers are contributed by (A-2) and wherein components (A) and (B) are employed in such quantities that the resultant epoxide equivalent weight is from about 350 to about 10,000; whereby there is obtained a cationic, advanced epoxy resin having a charge density of from about 0.2 to about 0.6 milliequivalent of charge per gram of resin.

3. The process of claim 2 in which the amount of diglycidyl ether of an aliphatic diol which is essentially free of ether oxygen atoms is from about 10 weight percent to about 50 weight percent.

4. The process of claim 3 in which the amount of diglycidyl ether of an aliphatic diol which is essentially free of ether oxygen atoms is from about 15 weight percent to about 35 weight percent.

5. The process of claim 4 in which the diglycidyl ether of an aliphatic diol which the essentially free of ether oxygen atoms has the approximate formula

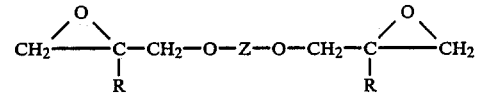

wherein each R is independently hydrogen or a hydrocarbyl group having from 1 to 3 carbon atoms; Z is a divalent aliphatic or cycloaliphatic group having from 2 to about 20, carbon atoms or one of the groups represented by the formulas

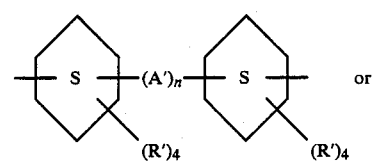

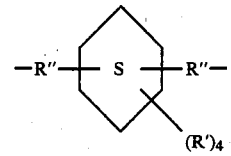

A' is a divalent hydrocarbon group having from 1 to about 6 carbon atoms; each R' is independently hydrogen, a hydrocarbyl or hydrocarbyloxy group having from 1 to 4 carbon atoms; each R" is an aliphatic group having from 1 to about 6 carbon atoms; and n has a value of zero or 1.

6. The process of claim 5 in which the epoxide equivalent weight of the advanced epoxy resin is from about 600 to about 3,000.

7. The process of claim 6 in which the diglycidyl ether of a dihydric phenol has the formula

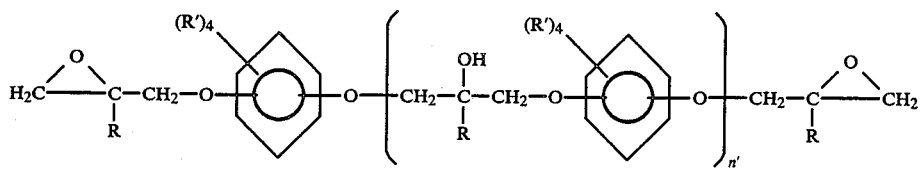
FORMULA I wherein each R independently is hydrogen or a hydrocarbyl group having from 1 to 3 carbon atoms, each R' independently is hydrogen, a hydrocarbyl or a hydrocarbyloxy group having from 1 to about 4 carbon atoms or a halogen and n' has a value from zero to about 10.

8. The process of claim 6 in which the diglycidyl ether of a dihydric phenol has the formula

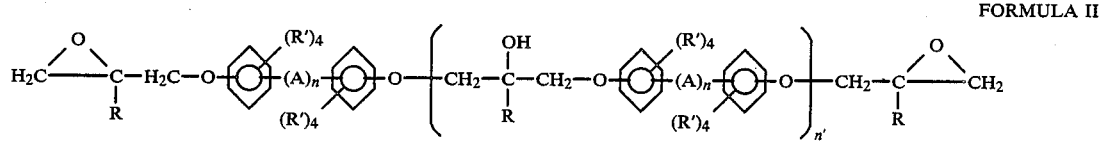
FORMULA II wherein A is a divalent hydrocarbon group having from 1 to 12 carbon atoms; —S—, —S—S—, —SO—, —SO$_2$—, —CO—, —O—CO—O—, or —O—; each R' is independently hydrogen, a hydrocarbyl or hydrocarbyloxy group having from 1 to 4 carbon atoms, or a halogen; R is independently hydrogen or a hydrocarbyl group having from 1 to 3 carbon atoms; n has a value from zero to 1; and n, has a value from zero to 10.

9. The process of claim 7 in which n' has a value from 0.1 to about 5.

10. The process of claim 8 in which n' has a value from 0.1 to about 5.

11. The process of claim 9 in which the amount of component (A) is from about 60 percent to about 90 percent and the amount of component (B) is from about 40 percent to about 10 percent, the percentage being based on the total weight of components (A) and (B).

12. The process of claim 10 in which the amount of component (A) is from about 60 percent to about 90 percent and the amount of component (B) is from about 40 percent to about 10 percent, the percentage being based on the total weight of components (A) and (B).

13. The process of claim 11 wherein the advanced epoxy resin, before conversion to a cationic resin, has an oxirane content of from about 1 to about 5 percent based on the total weight of the resin.

14. The process of claim 13 wherein the advanced epoxy resin, before conversion to a cationic resin, has an oxirane content of from about 2 percent to about 4 percent, based on the total weight of resin.

15. The process of claim 10 wherein the advanced epoxy resin, before conversion to a cationic resin, has an oxirane content of from about 1 to about 5 percent based on the total weight of the resin.

16. The process of claim 15 wherein the advanced epoxy resin, before conversion to a cationic resin, has an oxirane content of from about 2 percent to about 4 percent, based on the total weight of resin.

17. The process of claim 2, 3, 4, 5, 6, 7, 8, 9, 10, 11, 12, 13, 14, 15 or 16 in which the amount of capping agent, Component (C), is from about 1 to about 15 percent based on the total weight of diglycidyl ethers.

18. The process of claim 17 in which the capping agent is a monofunctional phenol.

* * * * *